(12) United States Patent
Holscher et al.

(10) Patent No.: US 7,975,108 B1
(45) Date of Patent: Jul. 5, 2011

(54) REQUEST TRACKING DATA PREFETCHER APPARATUS

(76) Inventors: Brian Holscher, Hillsboro, OR (US);
Dean Gaudet, San Francisco, CA (US)

( * ) Notice: Subject to any disclaimer, the term of this patent is extended or adjusted under 35 U.S.C. 154(b) by 247 days.

(21) Appl. No.: 10/810,196

(22) Filed: Mar. 25, 2004

(51) Int. Cl.
*G06F 12/00* (2006.01)

(52) U.S. Cl. ........ 711/137; 711/118; 711/156; 711/204; 711/221

(58) Field of Classification Search .................. None
See application file for complete search history.

(56) References Cited

U.S. PATENT DOCUMENTS

| | | | | |
|---|---|---|---|---|
| 5,694,568 A | * | 12/1997 | Harrison et al. | 711/213 |
| 5,941,981 A | * | 8/1999 | Tran | 712/207 |
| 6,081,868 A | * | 6/2000 | Brooks | 711/3 |
| 6,449,697 B1 | * | 9/2002 | Beardsley et al. | 711/137 |
| 6,625,696 B1 | * | 9/2003 | Willke, II | 711/137 |
| 6,678,795 B1 | * | 1/2004 | Moreno et al. | 711/137 |
| 6,742,085 B2 | * | 5/2004 | Hill et al. | 711/137 |
| 6,813,693 B2 | * | 11/2004 | Chilimbi | 711/137 |
| 6,820,173 B1 | * | 11/2004 | Bittel et al. | 711/137 |
| 7,065,630 B1 | * | 6/2006 | Ledebohm et al. | 711/206 |
| 2002/0073405 A1 | * | 6/2002 | Chilimbi | 717/151 |

OTHER PUBLICATIONS

Microsoft Computer Dictionary, 2002, Microsoft Press, Fifth Edition, p. 304.*

* cited by examiner

*Primary Examiner* — Shawn X Gu (57) ABSTRACT

A request tracking data prefetch apparatus for a computer system is described. The apparatus includes a prefetcher coupled to a memory of the computer system. A tracker is coupled to the prefetcher, and is configured to recognize an access to a plurality of cache lines of the memory by a processor of the computer system. A cache memory is coupled to the prefetcher. The prefetcher predictively loads a target cache line of the memory into the cache memory. The target cache line for the predictive load is indicated by the tracker.

25 Claims, 8 Drawing Sheets

REQUEST TRACKING DATA PREFETCHER APPARATUS

FIELD OF THE INVENTION

The field of the present invention relates to the memory performance of digital computer systems.

BACKGROUND OF THE INVENTION

A primary factor in the utility of a computer system is its speed in executing application programs. Thus, it is important to provide software instructions and data to a processor (e.g., central processing unit, or CPU) at least as fast as the rate at which the CPU executes such instructions and data. Failure to provide the needed instructions/data results in the CPU idling, or stalling, as it waits for instructions. Modern integrated circuit fabrication technology has enabled the production of CPUs that function at very high speeds (e.g., 2 gigahertz and above). Consequently, it has become challenging for system designers to ensure that the needed instructions/data are provided to a modern high-speed CPU from the system memory without imposing substantial CPU idle time penalties.

A widely used solution for reducing CPU stall time involves the incorporation of highly optimized memory caches within the CPU die. In general, a memory cache is used to speed-up data transfer. Memory caches are well known and widely used to speed-up instruction execution and data retrieval. These caches serve as staging areas, and are optimized to reduce data access latency in comparison to system memory. In addition to the incorporation of caches, various prior art memory prefetch schemes have been implemented to further reduce data access latency. However, modern high-speed CPUs are rendering even the most elaborate prior art caching/prefetching schemes inadequate.

SUMMARY OF THE INVENTION

Embodiments of the present invention comprise a method and system for a request tracking data prefetcher apparatus.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention comprise a request tracking data prefetch apparatus and method for a computer system. Embodiments of the present invention provide a solution that can significantly reduce data access latency by a processor of a computer system. Embodiments of the present invention and their benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "accessing" or "providing" or "retrieving" or "translating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Present Invention

Figure 1:
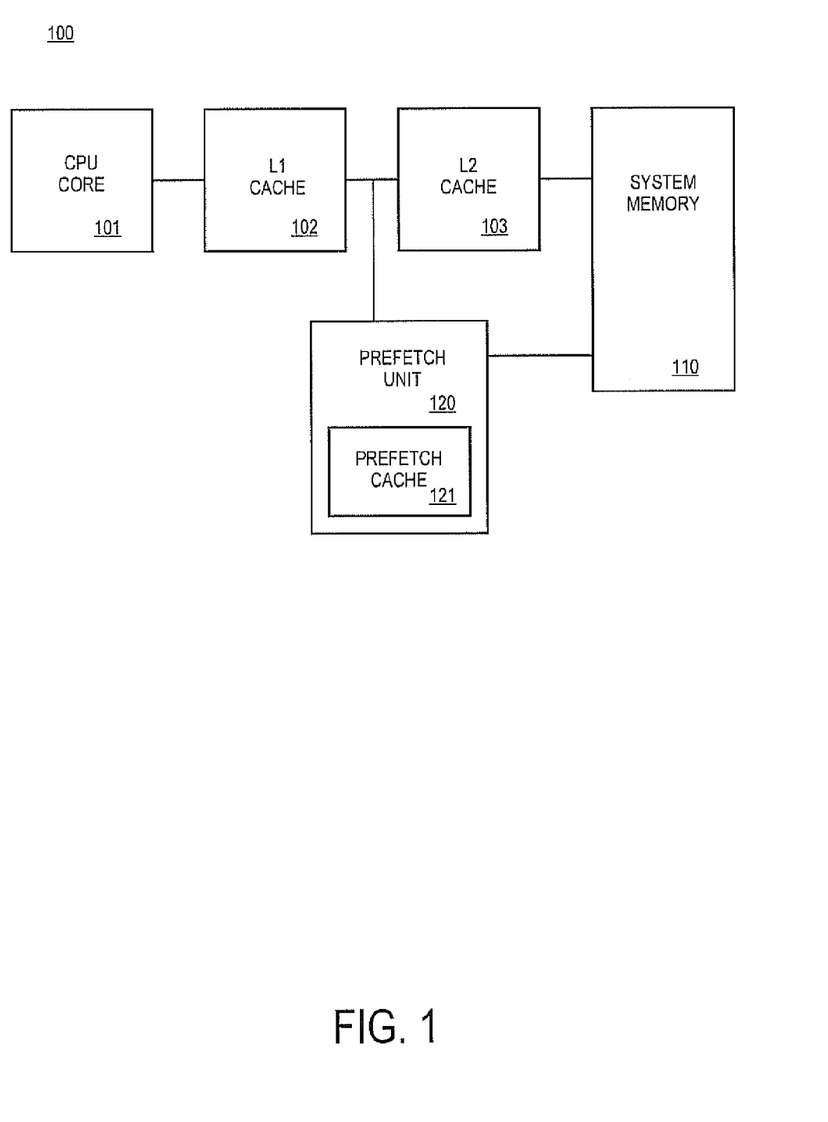
FIG. 1 shows the basic components of a computer system in accordance with one embodiment of the present invention.

FIG. 1 shows the basic components of a computer system 100 in accordance with one embodiment of the present invention. As depicted in FIG. 1, the computer system 100 shows a processor core 101 (e.g., a CPU core) coupled to an L1 cache 102 and an L2 cache 103 as shown. The CPU core 101, the L1 cache 102, and the L2 cache 103 are coupled to a memory 110 (e.g., a system memory of the computer system 100). In the present embodiment, a prefetch unit 120 is coupled to the system memory 110 and the L1 cache 102 as shown.

In the system 100 embodiment, the prefetch unit 120 is configured to observe accesses by the CPU 101 to the system memory 110 (e.g., by observing traffic between the L1 cache 102, the L2 cache 103, and/or the system memory 110). The monitoring allows the prefetch unit 120 to recognize an access to a plurality of cache lines stored the system memory 110 by the CPU 101. The observations allow the prefetch unit 120 to intelligently target a number of cache lines stored in the system memory 110 and to predictively load these "target" cache lines into an internal prefetch cache 121. If the CPU 101 subsequently requests the target cache lines, they are fetched from the prefetch cache 121 as opposed to the system memory 110 (e.g., and loaded into the L1 cache 102).

The prefetch cache 121 is engineered to yield much lower data access latency in comparison to the system memory 110. Thus the overall data access latency of the computer system 100 is lower when cache lines can be fetched from the prefetch cache 121 (e.g., the low latency path) as opposed to the system memory 110 (e.g., the high latency path). Embodiments of the present invention intelligently predict which cache lines will soon be accessed by the CPU 101, and loads these target cache lines into its prefetch cache 121.

As known by those skilled in the art, modern CPUs primarily process data and instructions from their caches (e.g., L1 cache 102 and L2 cache 103). Modern processors typically incorporate the L1 and L2 caches on-chip. When a cache miss occurs (e.g., when needed data is not in the on-chip caches), the data must be fetched from system memory (e.g., system memory 110). The system memory typically comprises an off-chip array of memory components that are coupled to the CPU via a chip set (e.g., a memory controller, one or more bridge components, etc.). Accesses to system memory have a much higher latency in comparison to accesses to the L1 or L2 caches.

As is known in the art, to reduce the latency penalties incurred in system memory accesses, transfers to and from system memory 110 occur in large blocks of data, commonly referred to as cache lines (e.g., due to the fact that the blocks are transferred in a manner to refill the CPU's L1 and/or L2 caches). For example, an entire block of memory, containing a certain number of bytes (e.g., a cache line) is read and cached at once, rather than reading a single word or byte from main memory at a time. This takes advantage of the principle of locality of reference, in that if one location is read then nearby locations are likely to be read soon afterwards. This is particularly true for sequentially adjacent locations (e.g., following locations that are directly next to preceding locations). In addition, reading entire cache lines at once can also take advantage of page-mode DRAM which allows faster access to consecutive locations.

Referring still to FIG. 1, the system 100 embodiment of the present invention prefetches target cache lines from the system memory 110 into its internal prefetch cache 121 so that a subsequent access from the CPU core 101 allows a load of the L1 cache 102 to occur from the prefetch cache 121 as opposed to occurring from the system memory 110 or the L2 cache 103. In the present embodiment, the L2 cache 103 is an inclusive-type cache.

In an alternative embodiment, the prefetch unit 120 is configured to prefetch target cache lines from the system memory 110 directly into the L2 cache 103 as opposed to any internal prefetch cache (e.g., prefetch cache 121).

Figure 2:
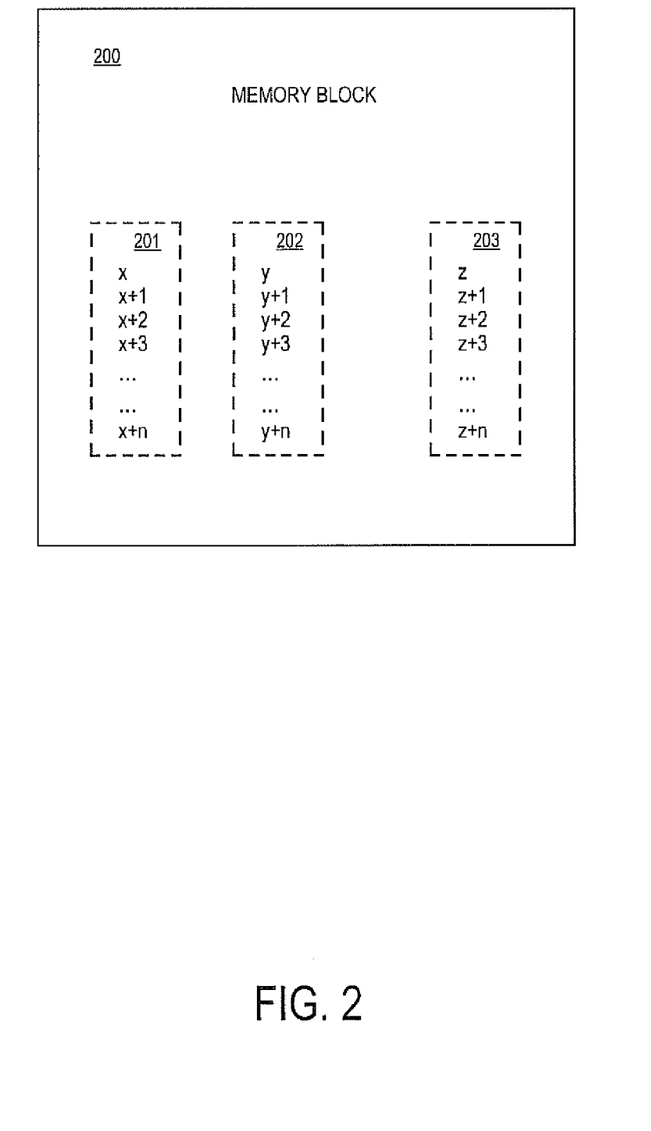
FIG. 2 shows a memory block of a computer system in accordance with one embodiment of the present invention.

FIG. 2 shows a memory block 200 of a computer system in accordance with one embodiment of the present invention. In one embodiment, the memory block 200 comprises one of a number of such memory blocks of a system memory. As known by those skilled in the art, many computer system architectures divide their system memory into a plurality of memory blocks, or pages. For example, x86 computer systems organize and utilize system memory as a series of 4 KB pages.

As described above, embodiments of the present invention function by making intelligent decisions regarding which cache lines to prefetch from the system memory (e.g., memory block 200). Observations of access patterns can yield clues as to which cache lines should be prefetched. Three access patterns 201-203 are shown within the memory block 200. In this example, the access patterns 201-203 are stream-type sequential access patterns to adjacent cache lines within the memory block 200. For example, access patterns 201 show an access to cache line x, then x+1, x+2, and so on. Observations of such sequential accesses enable the intelligent prefetch of subsequent cache lines (e.g., x+3, and so on). Such sequential accesses can be sequential incrementing (e.g., patterns 201-202) or sequential decrementing (e.g., pattern 203). Embodiments of the present invention can recognize multiple stream-type access patterns and prefetch cache lines for each stream accordingly. For example, each of the access streams 201-203 can be recognized and tracked, thereby allowing the predictive prefetching of cache lines for each of the streams 201-203 (e.g., x+n, y+n, z−n, etc.).

Figure 3:
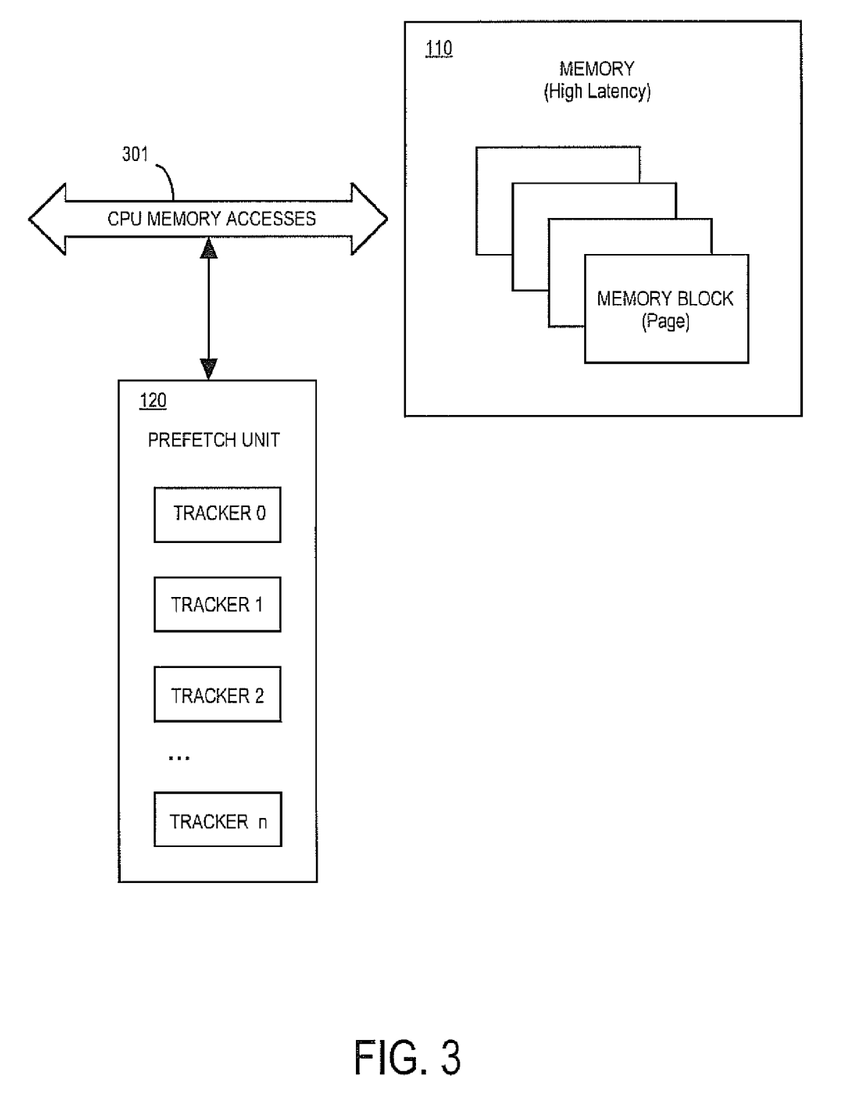
FIG. 3 shows a diagram depicting a plurality of trackers within the prefetch unit in accordance with one embodiment of the present invention.

FIG. 3 shows a diagram depicting a plurality of trackers within the prefetch unit 120 in accordance with one embodiment of the present invention. In the present embodiment, a tracker is used to track accesses to a corresponding memory block (e.g. page) of the system memory 110. Thus for example, "n" trackers can be used to track accesses for n pages of system memory. For example, each tracker can be used to observe and detect stream-type access patterns (e.g., access patterns 201-203 shown in FIG. 2). The observations occur by snooping CPU memory accesses 301 as shown in FIG. 3. The trackers thus indicate, or predict, which "target" cache lines should be prefetched.

It should be noted that embodiment of the present invention can monitor CPU memory accesses using a number of different means. For example, in one embodiment, CPU memory accesses can be examined by monitoring traffic on the bus between the L1 cache and the L2 cache (e.g., as shown in FIG. 1). In other embodiments, traffic between the CPU core and the L1 cache can be monitored, or traffic between the L2 cache and system memory 110 can be monitored.

In addition, it should be noted that embodiments of the present invention can be configured to prefetch target cache lines from the system memory 110 directly into the L2 cache 103 as opposed to any internal prefetch cache (e.g., prefetch cache 121). Similarly, in one embodiment, target cache lines can be prefetched directly into the L1 cache. In each case, an objective is to move target cache lines from high latency storage to low latency storage.

It should also be noted that the prefetch unit 120 is configured to avoid bandwidth contention on the system memory bus with the CPU 101. Any implemented prefetch unit 120 accesses to the system memory are timed to utilize CPU-to-system memory idle time, thereby giving priority to CPU accesses to system memory.

Figure 4:
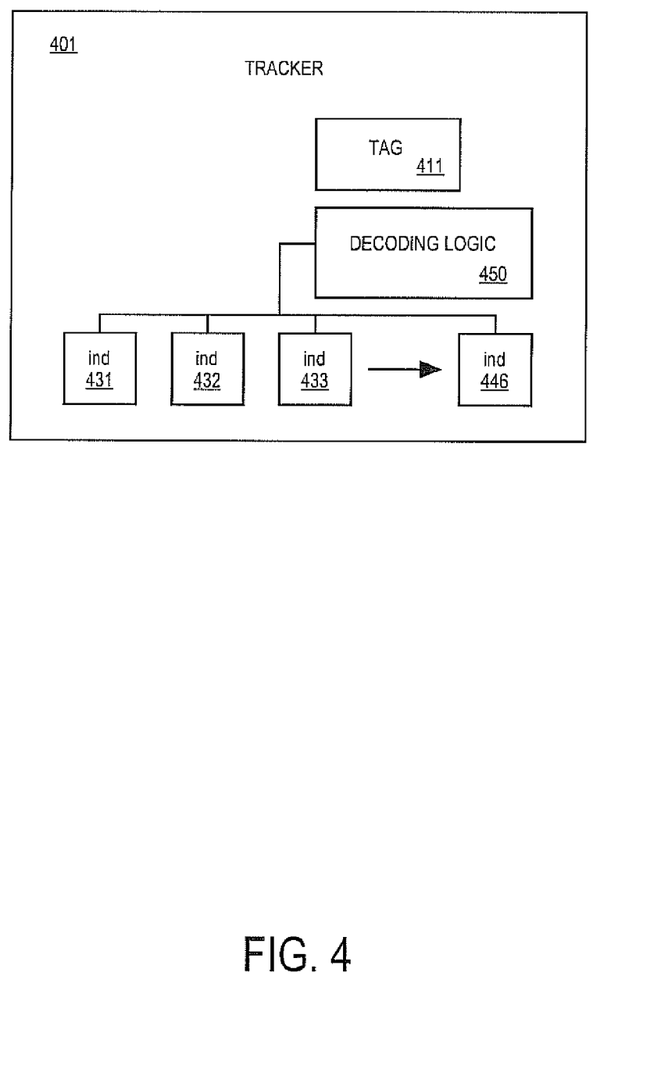
FIG. 4 shows a diagram of an exemplary tracker in accordance with one embodiment of the present invention.

FIG. 4 shows a diagram of an exemplary tracker 401 in accordance with one embodiment of the present invention. As depicted in FIG. 4, the tracker 401 includes a tag 411 and a decoder 450 as shown. A plurality of indicator bits 431-446 are coupled to the decoder 450 as shown.

In the FIG. 4 embodiment, the tag 411 stores the address of a page of physical memory. In other words, the tag stores a sufficient number of address bits in order to recognize an access to one of the plurality of cache lines of a given page of memory. As memory pages are initialized (e.g., by the operating system), a tracker (e.g., tracker 401) can be assigned to that particular memory page to observe CPU access to that memory page. The page is assigned by loading the appropriate page address into the tag 411. Once assigned, the tag 411 recognizes accesses to its assigned page and uses the decoder 450 to determine exactly which cache line of the page is addressed. The decoder decodes the appropriate portion of the address (e.g., the lower bits of the address) to determine the particular cache line. When the cache line is accessed by the CPU, the decoder 450 sets its indicator accordingly (e.g., sets an indicator bit to one), thereby notifying the prefetcher. In this manner, the indicators 431-446 form a bit vector that is used to predict target cache lines for prefetching.

Figure 5:
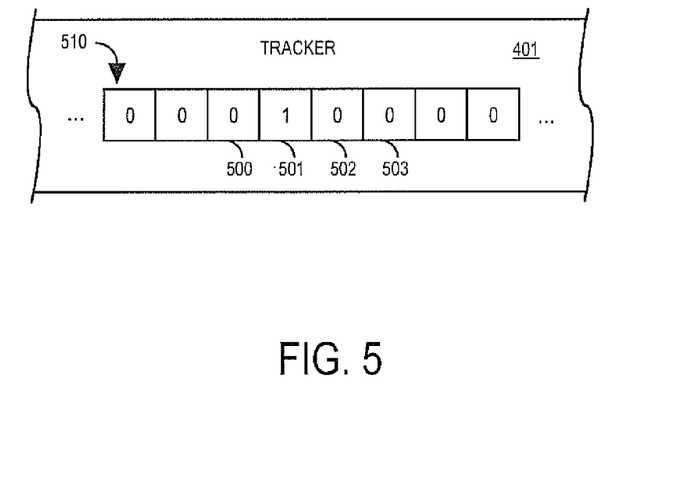
FIG. 5 shows a portion of an example bit vector in accordance with one embodiment of the present invention.
Figure 6:
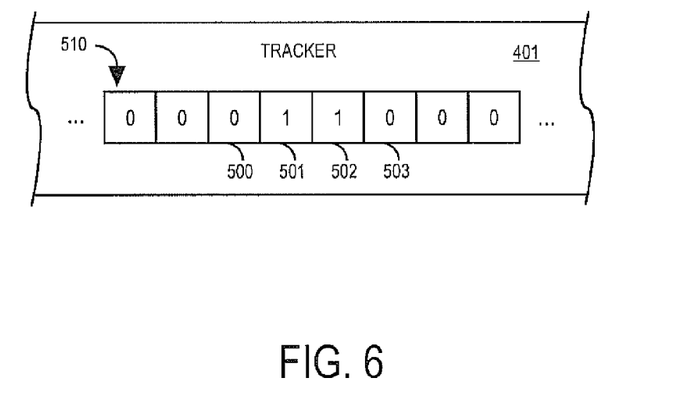
FIG. 6 shows a portion of the example bit vector of FIG. 5 after a stream of accesses from a CPU in accordance with one embodiment of the present invention.

FIG. 5 and FIG. 6 show a portion of an example bit vector 510 in accordance with one embodiment of the present invention. Referring to FIG. 5, indicator 501 shows an access to its corresponding cache line (e.g., logical one). The adjacent cache lines have not been accessed, as shown by the indicators 500 and 502 (e.g., logical zero). Subsequently, in FIG. 6, the adjacent cache line is accessed as shown by the indicator 502. Thus, the subsequent adjacent access can be recognized as a stream-type access, in this case, a sequential incrementing access, and thus be used to predictively load the cache line corresponding to the indicator 503. If the indicator 500 was accessed instead of the indicator 502, a sequential decrementing stream-type access can be recognized (e.g., stream 203 of FIG. 2) and the appropriate target cache line loaded accordingly. In this manner, by tracking accesses to the cache lines of a memory block (or page), the trackers indicate target cache lines for predictive loading into the prefetch cache.

In one embodiment, a tag of a tracker is configured to store 20 bits of address information. This corresponds to the first 20 bits of a physical address of system memory and can be used to track the 32 cache lines present in a system memory page, where each cache line is 128 bytes long and a memory page is 4 KB. The decoder decodes accesses to determine exactly which of the 32 cache lines are being accessed. Thus, the address bits loaded into one tag can be used to track all 32 cache lines present in the 4 KB page. A typical implementation can include 16 trackers, having 16 respective tags, to track 16 4 KB pages of system memory.

Alternatively, in one embodiment, less than a full page can be tracked in order to reduce the expenditure of scarce silicon area (e.g., of the CPU die) for a prefetch unit. For example, in such embodiment, each tag can be configured to store the first 21 bits of a physical address as opposed to the first 20 bits. This allows a tracker to track half of a 4 KB page, where each cache line is 128 bytes long. Thus, a 16 tracker implementation for tracking 16 4 KB half pages consumes much less silicon area. The relationship can be shown by the following expression:

16 trackers*(20 tag bits*32 indicator bits)>16 trackers*(21 tag bits+16 indicator bits).

It should be noted that the performance of a less-than-full page tracking embodiment retains a substantial amount of the capability provided by a full page tracking embodiment while greatly reducing the cost of the full page tracking embodiment. This is due in part to the fact that embodiments of the present invention are capable of functioning with 128 byte cache lines (e.g., 32 cache lines per 4 KB page), as opposed to 64 byte cache lines (e.g., 64 cache lines per 4 KB page).

Additionally, it should be noted that accesses which cross page boundaries are not tracked. As well-known the art, adjacent pages of physical memory can have no relationship to one another, and can be arbitrarily allocated by a memory management system (e.g., the operating system). Thus, there is no benefit to tracking stream-type accesses which cross page boundaries. Also, embodiments of the present invention can be configured to work with memory page sizes other than 4 KB.

Figure 7:
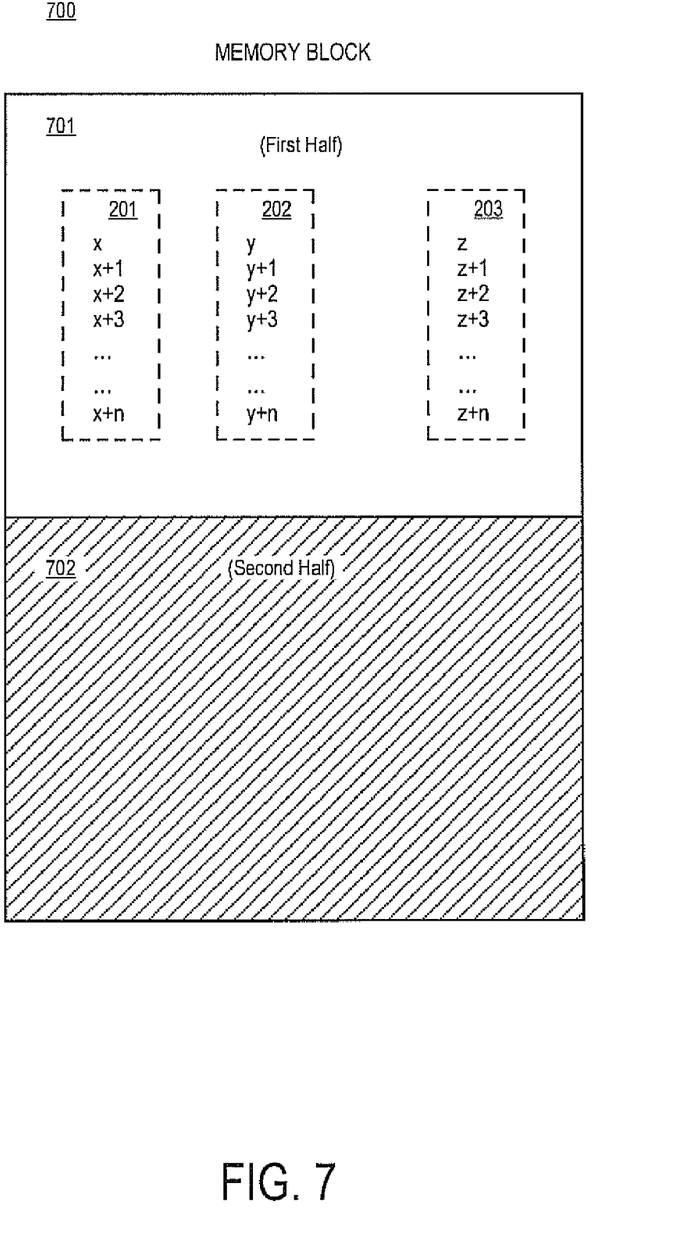
FIG. 7 shows a memory block depicting a half page tracking embodiment in accordance with one embodiment of the present invention.

FIG. 7 shows a memory block 700 depicting a half page tracking embodiment in accordance with one embodiment of the present invention. As illustrated in FIG. 7, the memory block 700 includes a first-half 701 and a second-half 702. In this embodiment, a tag is configured to track the first-half 701 of the memory block 700. Thus, the indicator bits can be used to detect stream type accesses 201-203 in the manner described above. Accesses to the second-half 702 are not monitored.

Figure 8:
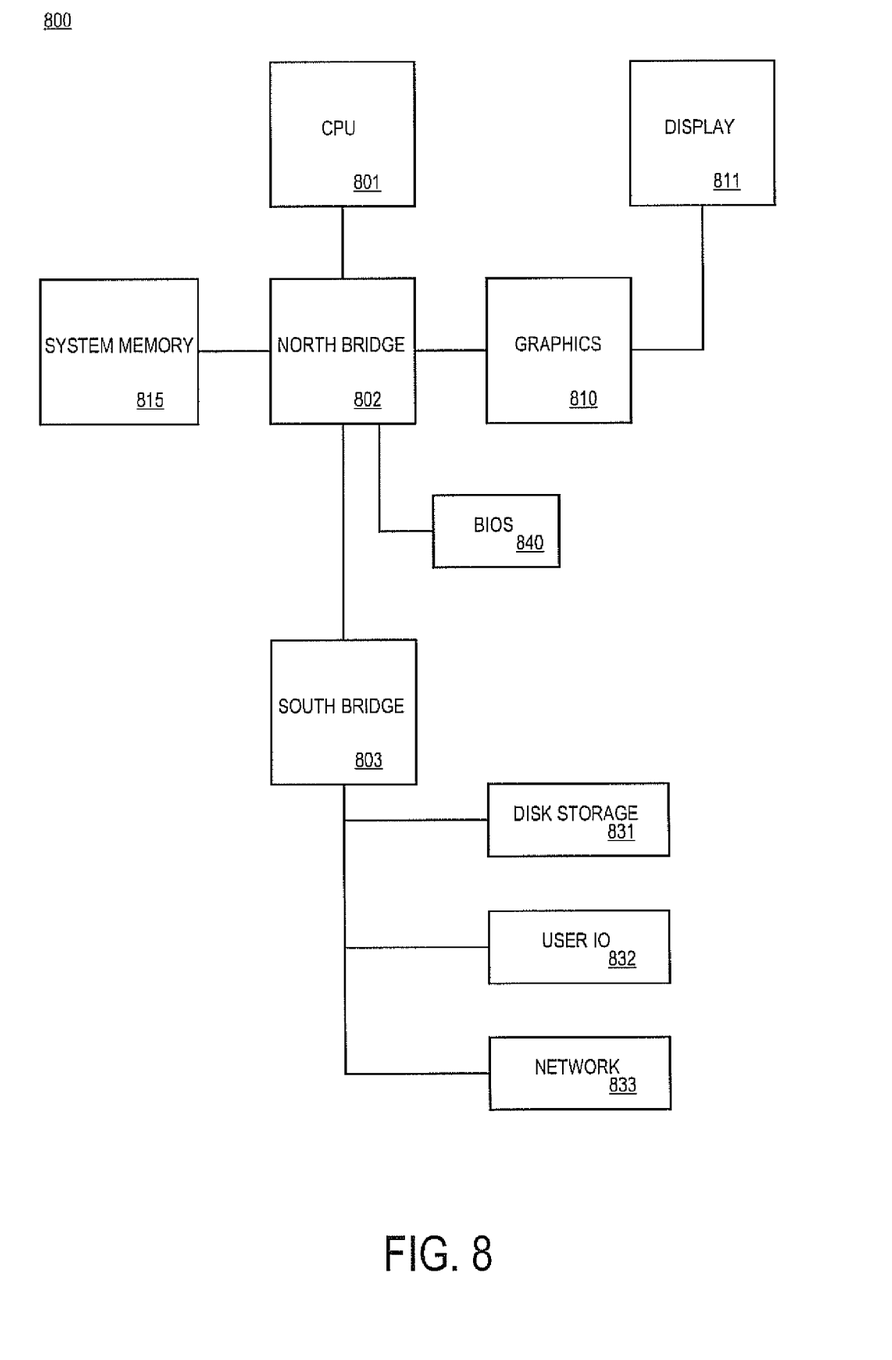
FIG. 8 shows the general components of a computer system in accordance with one embodiment of the present invention is shown.

With reference now to FIG. 8, a computer system 800 in accordance with one embodiment of the present invention is shown. Computer system 800 shows the general components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 800) and are executed by the CPU 801 of system 800. When executed, the instructions cause the system 800 to implement the functionality of the present invention as described above.

In general, system 800 comprises at least one CPU 801 coupled to a North bridge 802 and a South bridge 803. The North bridge 802 provides access to system memory 815 and a graphics unit 810 that drives a display 811. The South bridge 803 provides access to a plurality of coupled peripheral devices 831 through 833 as shown. Computer system 800 also shows a BIOS ROM 840 that stores BIOS initialization software.

Figure 9:
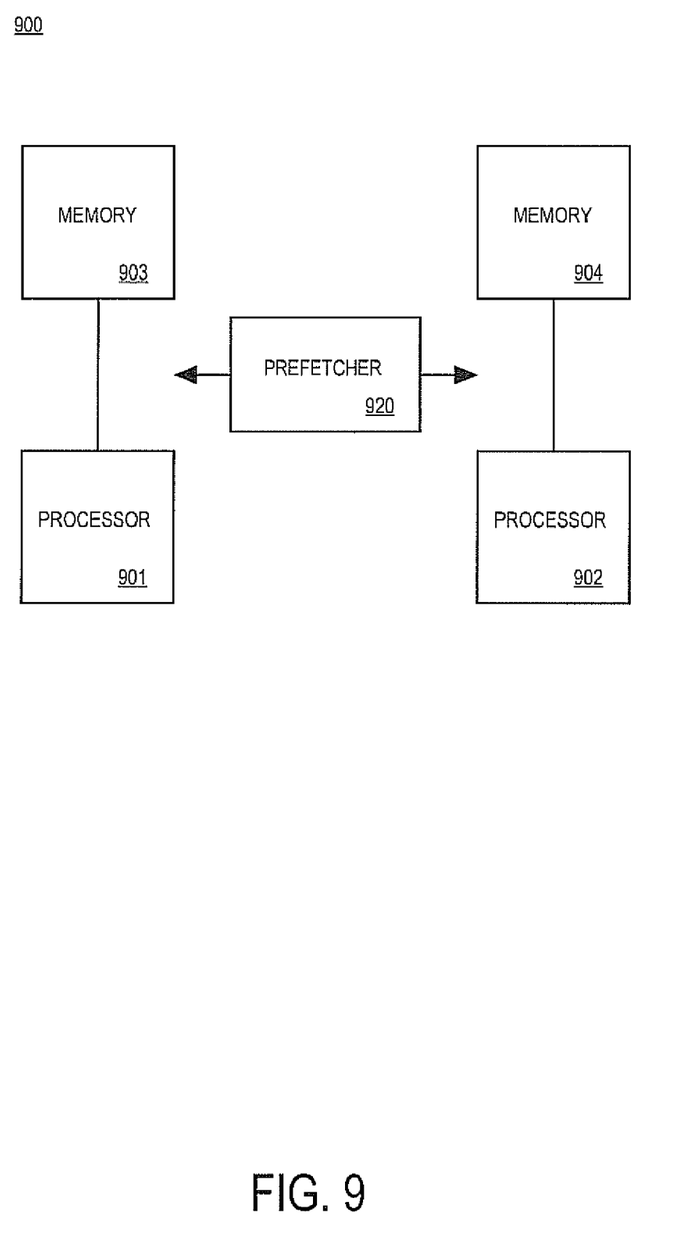
FIG. 9 shows a multi-processor computer system in accordance with one embodiment of the present invention.

FIG. 9 shows a multi-processor computer system 900 in accordance with one embodiment of the present invention. The computer system 900 includes two processors 901-902. The processors are coupled to a respective memory 903-904. The processors can execute code from their "near" memory or their "far" memory. For example, in the system 900 embodiment, processor 901 can execute code from its comparatively low latency near memory 903 or from its comparatively high latency far memory 904. The processor 901 accesses the memory 904 using, for example, a bridge component, a crossbar, or the like. The processor 902 accesses memory 904 (e.g., its near memory) or 903 (e.g., its far memory) in the same manner. Thus the prefetcher 920 embodiment functions by predictively moving target memory locations (e.g., cache lines or the like) from high latency (e.g., far) memory to low latency (e.g., near) memory. In the same manner as in the embodiments described above, the prefetcher 920 can monitor memory accesses by each processor, and using a bit vector, predictively prefetch memory locations to the near memory location for each processor, thereby intelligently arbitrating the movement of data between each processor-memory subsystem.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for a computer system, comprising:
a prefetcher coupled to a first memory for a processor of the computer system, the first memory having a first latency; and
a tracker within the prefetcher and configured to observe accesses by the processor to a plurality of cache lines wherein the accesses form a stream-type sequential access pattern having a direction that is tracked by setting bits in a bit vector, and wherein further the tracker is configured to use the bit vector to predictively load a target cache line indicated by the direction of the stream-type sequential access pattern from the first memory into a second memory having a second latency less than the first latency.

2. The apparatus of claim 1, wherein the tracker includes a tag configured to recognize accesses to corresponding cache lines of the first memory by the processor.

3. The apparatus of claim 2, wherein a plurality of accesses by the processor to the first memory as recognized by the tag are used by the tracker to determine the target cache line for a predictive load into the second memory.

4. The apparatus of claim 3, wherein consecutive accesses by the processor to adjacent cache lines of the first memory are used to determine the target cache line for a predictive load into the second memory, and wherein the adjacent cache lines have adjacent addresses.

5. The apparatus of claim 1, wherein the first memory comprises a memory block of a plurality of memory blocks of the computer system.

6. The apparatus of claim 5, wherein the first memory comprises a four kilobyte page of system memory of the computer system.

7. The apparatus of claim 5, wherein the tracker includes a tag configured to monitor a sub portion of the first memory for accesses by the processor.

8. The apparatus of claim 1, wherein the first memory is a system memory of the computer system.

9. The apparatus of claim 1, wherein the prefetcher comprises a prefetch cache operable to be used to load a cache line from the first memory.

10. A system, comprising:
a processor;
a first memory coupled to the processor, wherein the first memory has a first latency;
a prefetch unit coupled to the first memory;
a plurality of trackers included in the prefetch unit, wherein the trackers are respectively configured to recognize processor accesses to the first memory and to observe accesses to cache lines within a second memory having a second latency less than the first latency, the second memory operable to supply data to the processor responsive to processor data requests that form a sequential access pattern comprising an order in which adjacent storage locations in the first memory are accessed, wherein the order is tracked by setting bits in a bit vector; and
the second memory coupled to the prefetch unit, wherein the prefetch unit uses the bit vector to predictively load target second lines from the first memory into the cache memory, and wherein the target cache lines are indicated by the sequential access pattern identified by the bit vector.

11. The system of claim 10, wherein each of the trackers include a tag to recognize accesses to cache lines by the processor.

12. The system of claim 10, wherein a plurality of first memory accesses by the processor are used by the trackers to determine the target cache lines for a predictive load into the second memory.

13. The system of claim 12, wherein consecutive accesses by the processor to adjacent cache lines of a page are used to determine the target cache lines 00 for a predictive load into the second memory, wherein the adjacent cache lines have adjacent addresses.

14. The system of claim 10, wherein the first memory comprises a plurality of 4 KB pages.

15. The system of claim 10, wherein each of the plurality of trackers is configured to monitor a sub-portion of a page for accesses by the processor.

16. The system of claim 15, wherein the cache lines are 128 byte cache lines and wherein a tag is used to monitor half of a page for accesses by the processor.

17. The system of claim 10, wherein the second memory is a prefetch cache memory within the prefetch unit.

18. The system of claim 10, wherein the second memory is an L2 cache memory.

19. The system of claim 10, wherein said processor accesses to first memory are timed to utilize processor-to-system memory idle time.

20. A method, comprising:
monitoring data transfers between a first memory having a first latency and a second memory coupled to a processor by using a prefetcher, wherein and the second memory has a second latency less than the first latency, and wherein the prefetcher is coupled to the first memory, wherein the second memory is a cache memory operable to supply data to the processor responsive to processor data requests;
using bit vectors to track multiple stream-type sequential access patterns by the processor to the first memory, wherein the access patterns comprise orders in which adjacent storage locations in the first memory are accessed, wherein the orders are tracked by setting bits in respective bit vectors; and
prefetching data from the first memory to the second memory as indicated by the access patterns identified by the bit vectors.

21. The method of claim 20 wherein a computer system comprises a plurality of processors, and wherein the processors include a processor that is coupled to the first memory and the second memory.

22. The method of claim 20, wherein consecutive accesses by the processor to adjacent cache lines of the first memory are used to determine a target cache line of a stream type access pattern for a prefetching to the second memory, wherein the adjacent cache lines have adjacent addresses, and wherein the target cache line is part of stream-type accesses that formed the stream-type access pattern.

23. A device, comprising:
- means for observing data transfers between a first memory, having a first latency, and a second memory coupled to a processor, wherein the second memory is a cache memory operable to supply data to the processor responsive to processor data requests, and wherein the second memory has a second latency less than the first latency;
- means for using bit vectors to track multiple stream-type sequential access patterns by the processor to the first memory, wherein the access patterns comprise orders in which adjacent storage locations in the first memory are accessed, wherein the orders are tracked by setting bits in respective bit vectors; and
- means for prefetching data from the first memory to the second memory as indicated by the access patterns identified by the bit vectors.

24. The device of claim 23 wherein a computer system includes a plurality of processors, and wherein each of the processors is coupled to a respective first memory and a second memory.

25. The device of claim 23, wherein consecutive accesses by the processor to adjacent cache lines of the first memory are used to determine a target cache line of a stream type access pattern for a prefetching to the second memory, wherein the adjacent cache lines have adjacent addresses, and wherein the target cache line is part of stream-type accesses that formed the stream-type access pattern.

\* \* \* \* \*

UNITED STATES PATENT AND TRADEMARK OFFICE
CERTIFICATE OF CORRECTION

PATENT NO. : 7,975,108 B1  
APPLICATION NO. : 10/810196  
DATED : July 5, 2011  
INVENTOR(S) : Holscher et al.

Page 1 of 1

It is certified that error appears in the above-identified patent and that said Letters Patent is hereby corrected as shown below:

Column 7, line 51, in Claim 7, delete "sub portion" and insert -- sub-portion --.

Column 8, line 9, in Claim 10, delete "second lines from the first memory into the cache" and insert -- cache lines from the first memory into the second --.

Column 8, line 23, in Claim 13, delete "lines 00 for" and insert -- lines for --.

Column 8, line 44, in Claim 20, delete "wherein and the" and insert -- wherein the --.

Column 8, line 65, in Claim 22, delete "stream type" and insert -- stream-type --.

Column 10, line 10, in Claim 25, delete "stream type" and insert -- stream-type --.

Signed and Sealed this  
Eighth Day of November, 2011

David J. Kappos  
*Director of the United States Patent and Trademark Office*